United States Patent
Negre

(10) Patent No.: US 11,759,899 B2
(45) Date of Patent: Sep. 19, 2023

(54) TOOLING PLATE FOR CONVEYING DIFFERENT WORK PARTS IN AN ASSEMBLY LINE, AND METHOD FOR CONFIGURING THE SAME

(71) Applicant: ABB Schweiz AG, Baden (CH)

(72) Inventor: Bernard Negre, Paris (FR)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/631,244

(22) PCT Filed: Aug. 1, 2019

(86) PCT No.: PCT/EP2019/070749
§ 371 (c)(1),
(2) Date: Jan. 28, 2022

(87) PCT Pub. No.: WO2021/018399
PCT Pub. Date: Feb. 4, 2021

(65) Prior Publication Data
US 2022/0266402 A1 Aug. 25, 2022

(51) Int. Cl.
*B23P 21/00* (2006.01)
*B62D 65/18* (2006.01)

(52) U.S. Cl.
CPC ............ *B23P 21/004* (2013.01); *B62D 65/18* (2013.01); *B23P 2700/50* (2013.01)

(58) Field of Classification Search
CPC .... B23P 21/004; B23P 2700/50; B62D 65/18; Y02P 90/02; Y02P 90/30
See application file for complete search history.

(56) References Cited

U.S. PATENT DOCUMENTS

| | | | |
|---|---|---|---|
| 5,272,805 A | 12/1993 | Akeel et al. | |
| 5,347,700 A | 9/1994 | Tominaga et al. | |
| 7,134,191 B2 * | 11/2006 | Shioda ................ | H01R 43/205 29/760 |
| 2007/0205549 A1 | 9/2007 | Doan et al. | |
| 2018/0273243 A1 | 9/2018 | Kilibarda et al. | |

FOREIGN PATENT DOCUMENTS

| | | |
|---|---|---|
| DE | 202007009014 U1 | 11/2008 |
| WO | 2019020199 A2 | 1/2019 |

OTHER PUBLICATIONS

International Search Report and Written Opinion issued in International Application No. PCT/EP2019/070749, dated Mar. 30, 2020, 13 pages.

* cited by examiner

*Primary Examiner* — Rick K Chang
(74) *Attorney, Agent, or Firm* — Armstrong Teasdale LLP

(57) ABSTRACT

Disclosed herein is a tooling plate for conveying a plurality of work parts to be assembled on an assembly line, the tooling plate including a platform, a supporting element fixed on and protruding from a surface of the platform, and one or more interfacing elements configured to be attached in a removable way to the supporting element, and configured to support at least a portion of a work part from the plurality of work parts when the one or more interfacing elements is attached to the supporting element. A shape of the interfacing element matches a portion of a shape of the portion of the work part, so that the tooling plate can be configured to convey, successively, different sets of work parts by only changing interfacing elements on the supporting element, from one set to another set, without changing the platform.

10 Claims, 3 Drawing Sheets

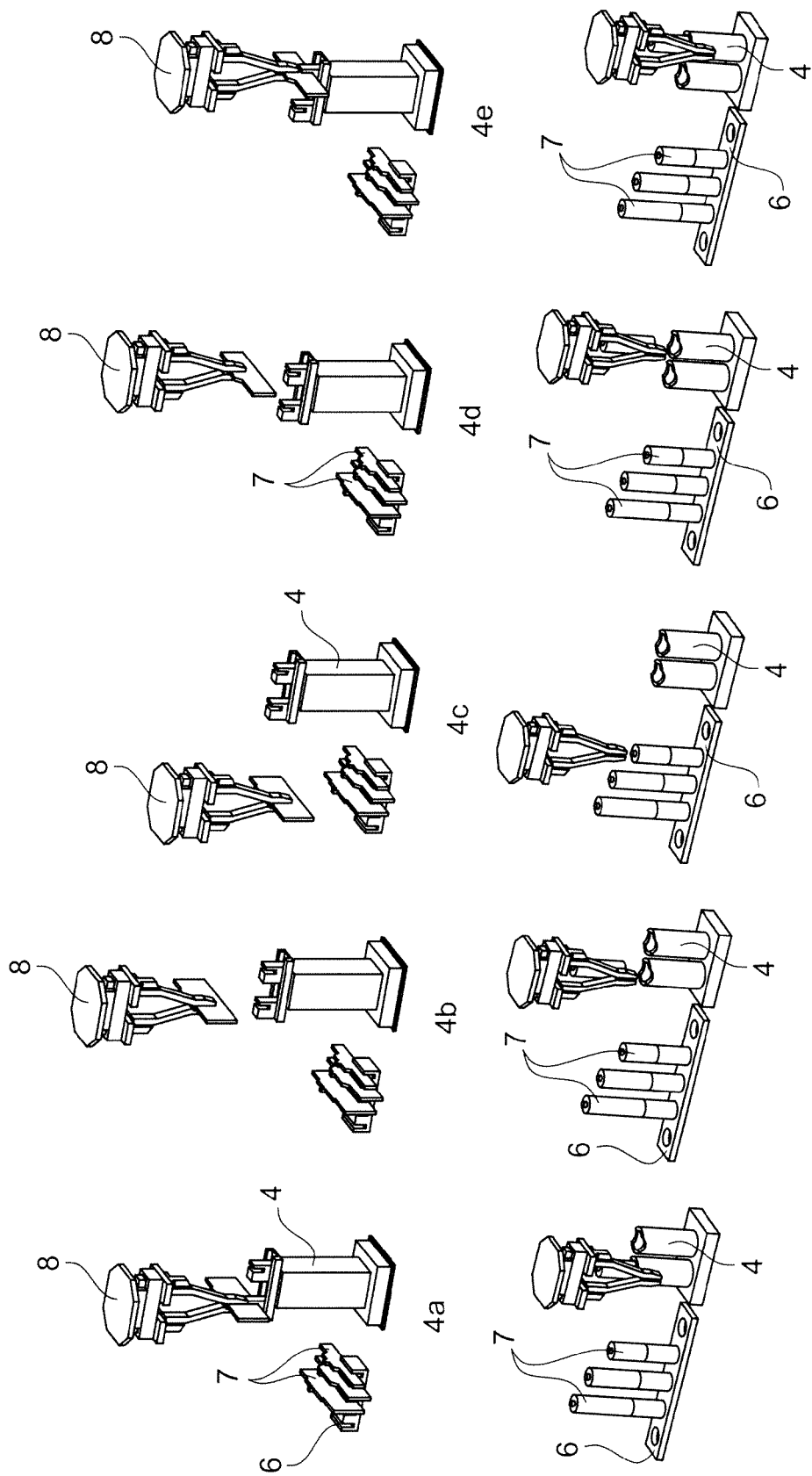

TOOLING PLATE FOR CONVEYING DIFFERENT WORK PARTS IN AN ASSEMBLY LINE, AND METHOD FOR CONFIGURING THE SAME

CROSS-REFERENCE TO RELATED APPLICATION

This application is a National Stage Entry of PCT/EP2019/070749, filed Aug. 1, 2019 and titled "TOOLING PLATE FOR CONVEYING DIFFERENT WORK PARTS IN AN ASSEMBLY LINE, AND METHOD FOR CONFIGURING THE SAME", which is hereby incorporated by reference in its entirety.

BACKGROUND

This disclosure relates to the field of industrial manufacturing, and more specifically to a mobile tooling plate configured to host a plurality of types of work parts compatible with different models to be produced.

It is known in the automotive industry, as described in document WO19020199, to use a unique mobile platform as a tooling plate to convey a complete set of automotive work parts from a workstation to another workstation within an assembly line including several workstations, wherein different work parts are successively assembled together, the assembly being put back on the platform among other work parts, until a final or an intermediate assembly is produced at the end of the assembly line process.

Today, in such automotive production plants, different tooling plates which are dedicated to nest work parts or intermediate work parts have to be prepared respectively, when dealing with a production line designed for several different models to be produced.

Traditional design of such tool plates is not compatible for several model production, so that the manufacturer has to prepare several types of tooling plates respectively for several different models to be produced. Changing tooling plates in a production plant takes a long time, and unused tooling plates are stored in spaces beside production lines, all this being costly.

Therefore, there is a need to enable several different models to be produced with the same tooling plate.

BRIEF DESCRIPTION

Embodiments of the present disclosure provide a tooling plate for conveying a plurality of work parts to be assembled on an assembly line, the tooling plate including:
a platform, and
a supporting element fixed on and protruding from a surface of the platform, and
one or more interfacing element(s) configured to be attached in a removable way to the supporting element, and configured to support at least a portion of a work part from the plurality of work parts, when it is attached to the supporting element, the one or more interfacing element(s) being shaped to match a portion of a shape of the portion of the work part, so that the tooling plate can be configured to convey successively different sets of work parts, by only changing interfacing elements on the supporting element, from one set to another set, without changing the platform.

Embodiments of the present disclosure include one or more of the following features, alone or in any combination technically compatible.

According to an embodiment, the tooling plate includes a plurality of supporting elements.

According to an embodiment, the tooling plate further includes a magazine associated with the supporting element, the magazine being attached to the platform, and the magazine being configured to store the one or more interfacing element(s), so that the tooling plate can convey the one or more interfacing elements required for configuring the tooling plate. The magazine may be attached to the platform in a removable way.

According to an embodiment, the tooling plate includes a plurality of magazines.

According to an embodiment, the tooling plate includes a plurality of supporting elements and one magazine is associated with one supporting element from a plurality of supporting elements.

According to these provisions, the tooling plate may be easily configured to convey different work parts by just attaching to the supporting element the right interfacing element. Thus, supporting a new work part does not require changing the whole tooling plate, and only the interfacing element needs to be changed, which may be stored and conveyed by the tooling plate after the interfacing element has been removed from the supporting element.

According to an embodiment, the plurality of work parts include a first plurality of first model work parts and a second plurality of second model work parts, the first plurality of first model work parts being configured to be assembled into a first model of a product, and the second plurality of second model work parts being configured to be assembled into a second model of the product, and wherein the one or more interfacing element(s) include one or more first interfacing element(s) and one or more second interfacing element(s), the one or more first interfacing element(s) being configured to support a portion of a first model work part from the first plurality of first model work parts, when the one or more first interfacing element(s) is attached in a removable way to the supporting element, and the one or more second interfacing element(s) being configured to support a portion of a second model work part from the second plurality of second model work parts, when the one or more second interfacing element(s) is attached in a removable way to the supporting element, so that the tooling plate may be configured to support alternatively the work parts of a first model of a product to be assembled, and the work parts of a second model of a product to be assembled.

According to these provisions, there is no more need to change the whole tooling plate when the product model changes, and only a set of interfacing elements needs to be changed to reconfigure the tooling plate.

According to an embodiment, the interfacing elements have a main extension along a plane.

According to an embodiment, the interfacing elements have a cylindrical or prismatic shape.

According to an embodiment, the one or more interfacing element(s) is/are configured to be automatically attached in a removable way to, or removed from, the supporting element.

According to an embodiment, the one or more interfacing element(s) is/are configured to be attached in a removable way to, or removed from, the supporting element, by using an industrial robot.

According to an embodiment, the tooling plate is mobile.

According to an embodiment, the tooling plate is autoguided.

According to an embodiment, the tooling plate includes a sub-plate, the sub-plate being placed and fixed in a removable way on the surface of the platform of the tooling plate, the sub-plate including supporting elements fixed on and protruding from a surface of the sub-plate, and one or more interfacing element(s) configured to be attached in a removable way to the supporting elements.

According to an embodiment, the sub-plate includes magazines attached in a removable way to the surface of the sub-plate, the magazines being configured to store the one or more interfacing elements.

According to an embodiment, the sequence of manufacturing stations is an automotive manufacturing assembly line.

According to another aspect, the disclosure provides a method for configuring a tooling plate according to anyone of the embodiments described hereinabove, the method including the steps of:

identifying the work part among the plurality of work parts, to be conveyed on the tooling plate, identifying an interfacing element, among the one or more interfacing elements, a shape of the interfacing element matching with a portion of a shape of a portion of the work part identified at previous step, if another interfacing element is attached to the supporting element, removing the another interfacing element from the supporting element, attaching in a removable way, the interface element identified previously, to the supporting element.

According to an embodiment, the step of removing the another interfacing element from the supporting element is followed by a step of storing the another interfacing element into a magazine associated with the supporting element.

According to an embodiment, the step of attaching, in a removable way, to the supporting element the interface element identified previously, is preceded by a step of grabbing the interface element from a magazine associated with the supporting element.

According to an embodiment, the method is carried out automatically, and the method may be carried out using an industrial robot.

BRIEF DESCRIPTION OF THE DRAWINGS

The foregoing and other purposes, features, aspects, and advantages of embodiments of the present disclosure will become apparent from the following detailed description of embodiments, given by way of illustration and not limitation with reference to the accompanying drawings, in which the same reference refer to similar elements or to elements having similar functions, and in which:

FIG. 4 illustrates some of the steps of the method according to an aspect of the present disclosure.

DETAILED DESCRIPTION

Figure 1:
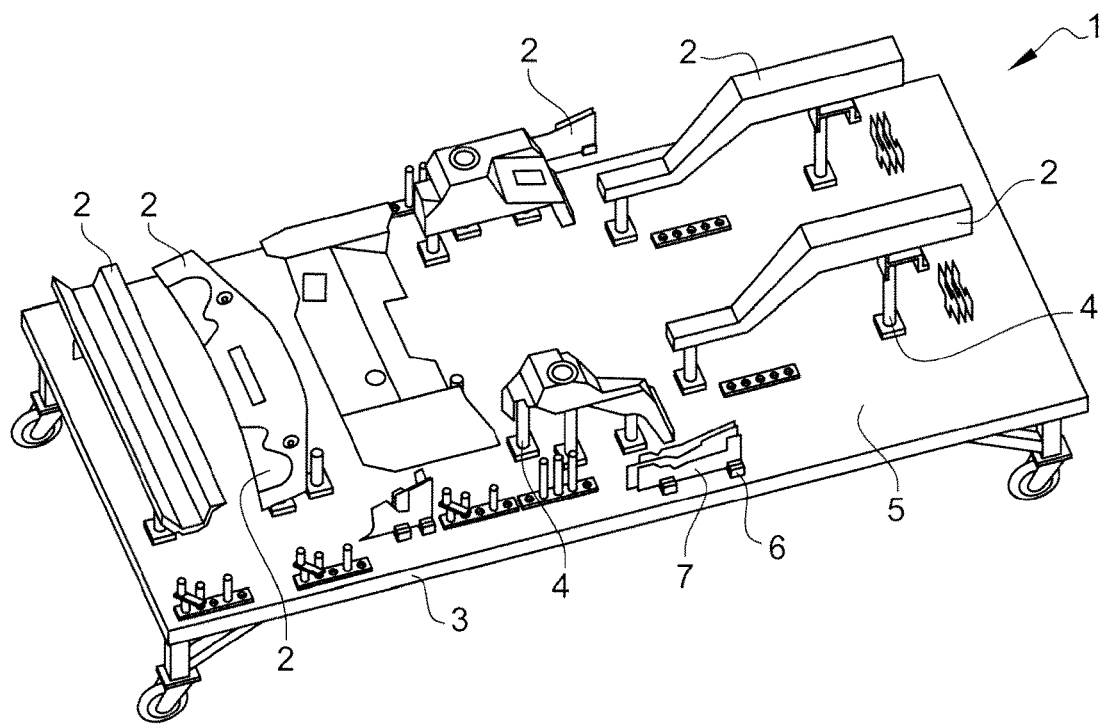
FIG. 1 shows a tooling plate carrying work parts, according to an embodiment of the present disclosure.

FIG. 1 shows a tooling plate 1, carrying a plurality of work parts 2. The work parts are each configured to be assembled on an assembly line, including different automated assembling workstations, and the tooling plate 1 has been prepared to convey the plurality of work parts 2 from a workstation to another workstation (not represented in the figure).

The tooling plate includes a platform 3 and one or more supporting element(s) 4, the one or more supporting element(s) 4 being configured to support a work part 2, more precisely a portion of a work part 2.

Figure 2:
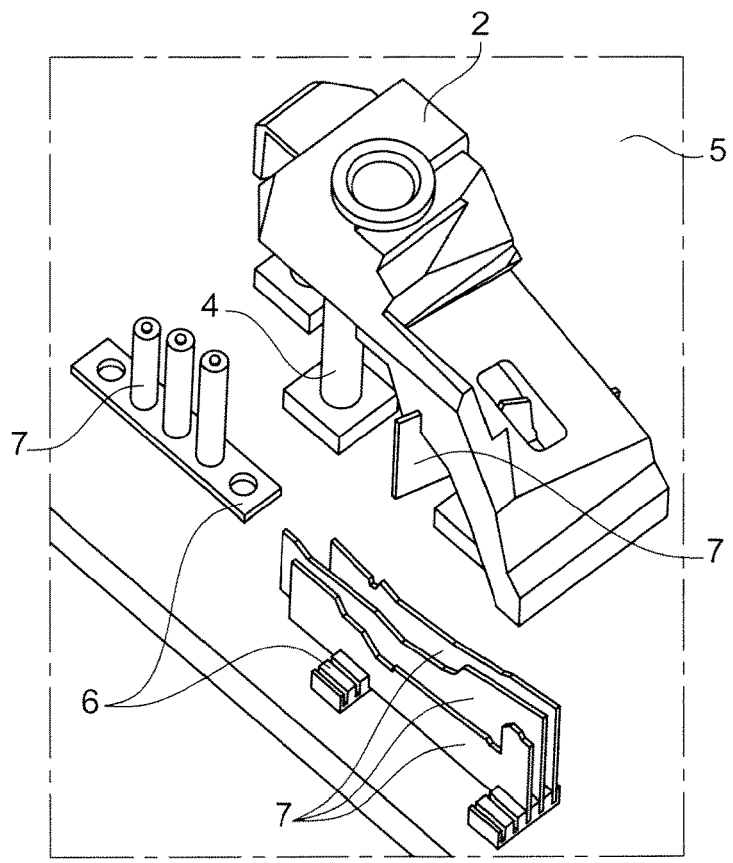
FIG. 2 is a zoom focusing on some aspects of the tooling plate represented in FIG. 1.

According to an embodiment illustrated in FIG. 2, the supporting element 4 is a tubular or prismatic element 4, fixed to the platform 3, and protruding from a surface of the platform 3.

To configure the supporting element 4 so that it supports a given work part 2, more precisely, so that it supports a portion of a given work part 2, an interfacing element 7 is attached in a removable way to the supporting element 4, the interfacing element 7 being itself configured to support the portion of the work part once it is attached in a removable way to the supporting element 4. The configuration of the interfacing element 7 is based on its shape which is partly matching with, meaning that it matches a portion of a corresponding shape of the portion of the work part 2 to be supported by the supporting element 4 in combination with the matching interfacing element 7.

Of course, there are almost as many interfacing elements 7 as there are differing work parts 2 shapes. In order to enable the same supporting element 4 to support alternatively a work part 2 with a given shape, and then another work part 2 with another given shape, alternatively, a first interfacing element 7 with the given shape is attached in a removable way to the supporting element 4, and then a second interfacing element 7 with the other given shape is attached in a removable way to the same supporting element 4, after having previously removed the first interfacing element 7 from the supporting element 4.

According to these provisions, the tooling plate 1 may be easily configured to support many different work parts 2, by just attaching to the supporting element 4 the right interfacing element 7. Thus, supporting a new work part 2, or a new set of work parts 2, does not require to change the whole tooling plate 1, only the interfacing element 7, or the set of interfacing elements 7, needs to be changed.

Figure 3:
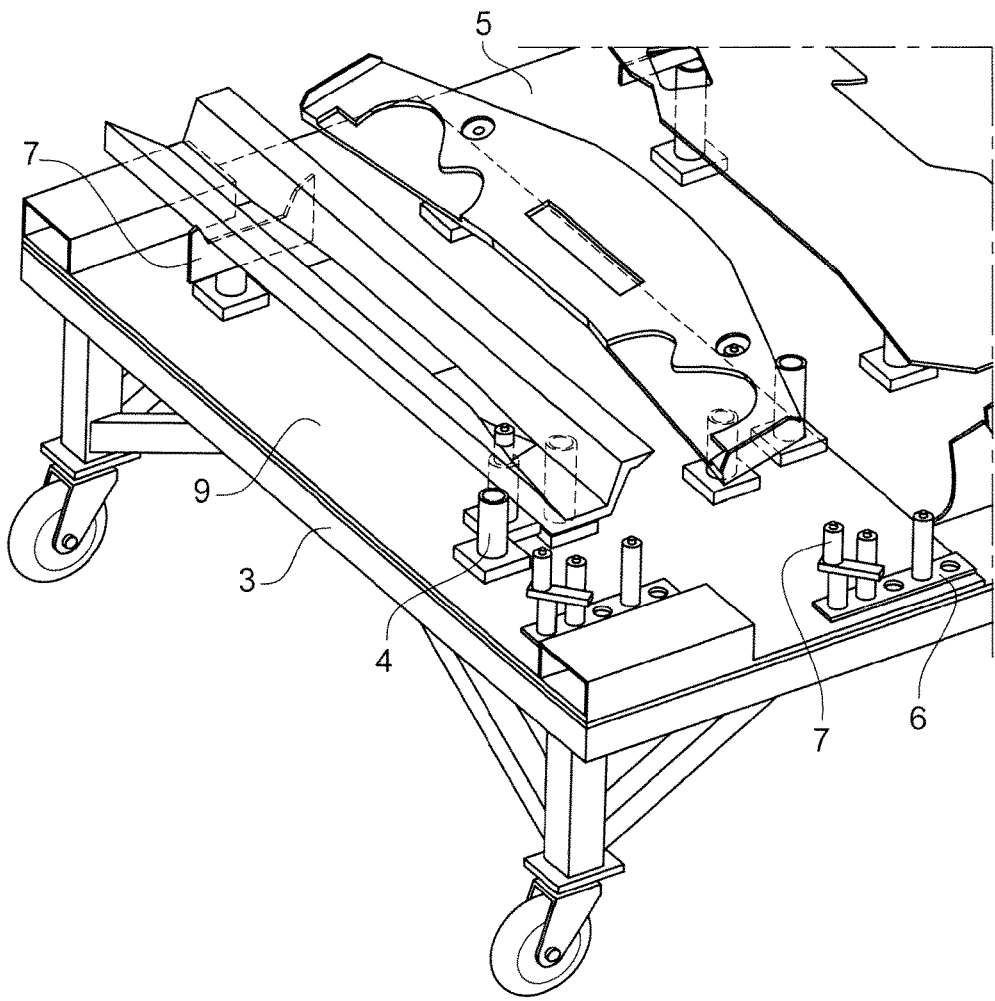
FIG. 3 shows another example of tooling plate configured to carry work parts, according to an embodiment of the present disclosure. This tooling plate is carrying a sub-plate that can be replaced.

As illustrated in FIGS. 2 and 3, interfacing elements 7 may be in the form of a blade with differing shapes, for example; interfacing elements 7 may also be in the form of tubular, or cylindrical, or prismatic elements having different shapes, to accommodate for different kind of work parts 2 portions to be supported.

According to an embodiment, a first set of interfacing elements 7 may be designed and configured to support a first set of work parts 2, the first set of work parts 2 being configured to be assembled into a first model of an industrial product, for example a motor vehicle, and a second set of interfacing elements 7 may be designed and configured to support a second set of work parts 2, the second set of work parts 2 being configured to be assembled into a second model of the industrial product, the first model and the second model being different models of the industrial product.

Thus, there is no more need to change the whole tooling plate 1 when the product model to be assembled changes, only a set of interfacing elements 7 needs to be changed to reconfigure the tooling plate 1 for the new product model.

According to an embodiment, the sets of interfacing elements 7 may be stored in one or more magazines 6, the one or more magazines 6 being placed either outside the surface of the platform 3 of the tooling plate 1, or on the surface of the platform 3 of the tooling plate 1. The magazines 6 may further be placed close to the supporting element 4 on which the interfacing elements 7 are to be attached to support a portion of a work part 2. The magazines 6 may be attached to the surface of the platform 3 of the tooling plate 1. The magazines 6 may be attached to the surface of the platform 3 of the tooling plate 1 in a removable way.

According to an embodiment illustrated in FIG. 3, a sub-plate 9 may be placed and fixed in a removable way on the surface 5 of the platform 3, the sub-plate 9 including supporting elements 4 attached to a surface of the sub-plate. The sub-plate 9 may also include magazines 6 attached in a removable way to the surface of the sub-plate 9. Thus, a preconfigured sub-plate 9 may be placed on a tooling plate 1 to be conveyed by the tooling plate 1.

Figure 5:
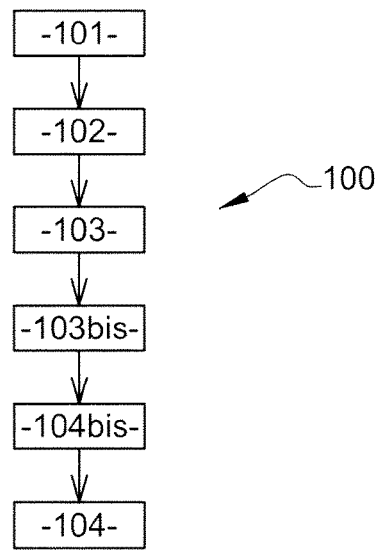
FIG. 5 is a schematic representation of the steps of the method according to an aspect of the present disclosure.

According to an aspect, the disclosure relates to a method 100 for configuring a tooling plate 1 according to anyone of the embodiments which have been described before. The method 100 will now be described in reference to FIG. 5, schematically representing the steps of method 100; the method 100 includes the steps of:

- identifying 101 the work part 2 among the plurality of work parts 2, to be supported on the tooling plate 1; this step may for example be automated, for example by selecting successively the work parts 2 in a list of the work parts 2 to be assembled to manufacture a given product.
- identifying 102 an interfacing element 7, among the one or more interfacing elements 7, a shape of the interfacing elements 7 matching with a portion of a corresponding shape of a portion of the work part 2 identified at previous step; this step of identifying 102 an interface element 7, may for example be automated based on the use of corresponding lists, which may be lists of work parts 2 on the one hand, and lists of interfacing elements 7 the shape of which matches with a portion of the shape of a portion of a work part 2 from the list of work parts 2.
- if another interfacing element 7 is attached to the supporting element 4, removing 103 the another interfacing element 7 from the supporting element 4 associated with the supporting element 4,
- attaching in a removable way 104 to the supporting element 4 the interface element 7 identified previously.

As illustrated in FIG. 4, the steps of removing 103 the another interfacing element 7 and attaching in a removable way 104 the interface element 7 may, for example, be automated through the use of an industrial robot not represented in FIG. 4, for example, with an end-tool 8 configured to grab and displace the interfacing elements 7.

According to an embodiment, the step of removing 103 the another interfacing element from the supporting element is followed by a step of storing 103bis the another interfacing element into a magazine associated with the supporting element. Hence, in FIG. 4, FIGS. 4a, 4b, and 4c illustrate the sequence of steps of grabbing, removing 103, and storing 103bis in a magazine 6, an interfacing element 7 being removed from a supporting element 4 by using an end-tool 8 carried by an industrial robot, not represented in the figure. In the upper part of FIGS. 4a, 4b, and 4c the interfacing elements 7 belong to a first category of so-called blade interfacing elements. Interfacing elements 7 belong to the category of blade interfacing elements 7 when the interfacing element 7 extends along a plane. The lower part of FIGS. 4a, 4b, and 4c illustrate the same sequence of steps of grabbing, removing 103, and storing 103bis in a magazine 6, an interfacing element 7, wherein the interfacing elements 7 belong to a second category of cylindrically shaped interfacing elements 7.

According to an embodiment, the step of attaching 104, in a removable way, to the supporting element the interface element 7 identified previously, is preceded by a step of grabbing 104bis the interface element from a magazine associated with the supporting element. In FIG. 4, upper and lower FIGS. 4d, and 4e, illustrate the sequence of steps of grabbing 104bis from a magazine 6, and attaching 104 in a removable way to a supporting element 4, an interfacing element 7, by using an end-tool 8 carried by an industrial robot not represented in the figure. Similarly, the interfacing elements 7 belong respectively in the upper part of FIG. 4, to a first category of so-called blade interfacing elements, and, in the lower part of FIG. 4, to a second category of cylindrically shaped interfacing elements 7.

The invention claimed is:

1. A tooling plate for conveying a plurality of work parts to be assembled on an assembly line, the tooling plate comprising:
    a platform;
    a supporting element fixed on and protruding from a surface of the platform; and
    a plurality of interfacing elements configured to be attached, in a removable way, to the same supporting element, and one of the plurality of interfacing elements configured to support at least a portion of a work part from the plurality of work parts when the one of the plurality of interfacing elements is attached to the supporting element,
    wherein a first interfacing element of the plurality of interfacing elements is shaped to match a portion of a shape of a portion of a first work part and a second interfacing element of the plurality of interfacing element is shaped to match a portion of a shape of a portion of a second work part, so that the tooling plate can be configured to convey successively different sets of work parts by only changing the plurality of interfacing elements on the same supporting element, from one set to another set, without changing the platform.

2. The tooling plate of claim 1, further comprising a magazine associated with the supporting element, the magazine being attached to the platform, and the magazine being configured to store the plurality of interfacing elements, so that the tooling plate can convey the plurality of interfacing elements required for configuring the tooling plate.

3. The tooling plate of claim 1 wherein the plurality of work parts comprise a first plurality of first model work parts and a second plurality of second model work parts, the first plurality of first model work parts being configured to be assembled into a first model of a product, and the second plurality of second model work parts being configured to be assembled into a second model of the product, and wherein the plurality of interfacing elements comprise one or more first interfacing elements and one or more second interfacing elements, the one or more first interfacing elements being configured to support a portion of a first model work part from the first plurality of first model work parts when the one or more first interfacing elements is attached, in a removable way, to the supporting element, and the one or more second interfacing elements being configured to support a portion of a second model work part from the second plurality of second model work parts when the one or more second interfacing elements is attached, in a removable way, to the supporting element, so that the tooling plate is configured to support alternatively the work parts of a first model of a product to be assembled, and the work parts of a second model of a product to be assembled.

4. The tooling plate of claim 1, wherein the plurality of interfacing elements is configured to be automatically attached, in a removable way, to the supporting element.

5. The tooling plate of claim 1, further comprising a sub-plate, the sub-plate being placed and fixed, in a removable way, on the surface of the platform of the tooling plate, the sub-plate comprising supporting elements fixed on and protruding from a surface of the sub-plate, and plurality of interfacing elements configured to be attached, in a removable way, to the supporting elements of the sub-plate.

6. The tooling plate of claim 1, wherein the tooling plate is autoguided.

7. The tooling plate of claim 1, wherein the tooling plate is configured to convey the plurality of work parts through a sequence of manufacturing stations in an automotive manufacturing assembly line.

8. A method for configuring the tooling plate according to claim 1, the method comprising:
    identifying a work part among the plurality of work parts to be conveyed on the tooling plate;
    identifying an interfacing element, among the plurality of interfacing elements, a shape of the interfacing element matching with a portion of a shape of a portion of the work part identified in identifying a work part;
    if another interfacing element is attached to the supporting element, removing the another interfacing element from the supporting element; and
    attaching, in a removable way, the interface element identified previously to the supporting element.

9. The tooling plate of claim 2, wherein the magazine is attached to the platform in a removable way.

10. The tooling plate of claim 1, wherein the plurality of interfacing elements is configured to be automatically removed from the supporting element.

* * * * *